(No Model.)
H. W. HILL.
FRICTION CLUTCH.
No. 374,834. Patented Dec. 13, 1887.
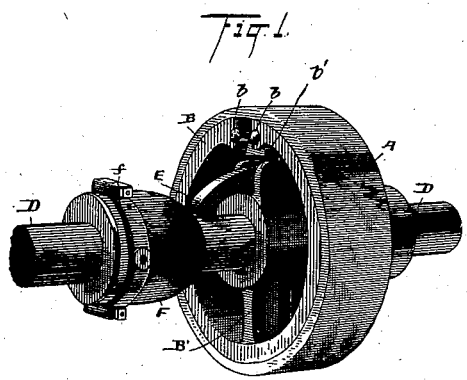
Fig. 1.
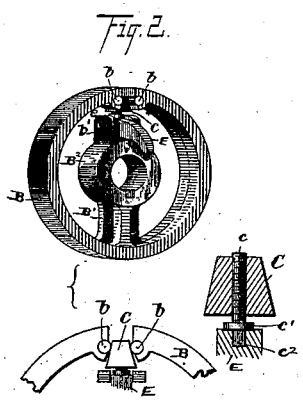
Fig. 2.
Fig. 4.
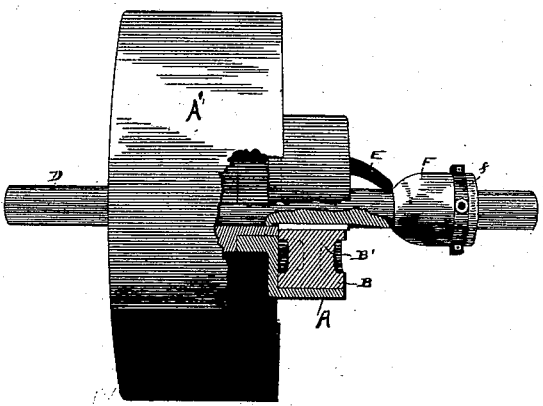
Fig. 3.
WITNESSES
C. S. Amstutz
Geo. W. King
Harry W. Hill   INVENTOR
By
Liggett & Liggett
Attorneys

UNITED STATES PATENT OFFICE.

HARRY W. HILL, OF CLEVELAND, OHIO.

FRICTION-CLUTCH.

SPECIFICATION forming part of Letters Patent No. 374,834, dated December 13, 1887

Application filed April 19, 1887. Serial No. 235,390. (No model.)

*To all whom it may concern:*

Be it known that I, HARRY W. HILL, of Cleveland, in the county of Cuyahoga and State of Ohio, have invented certain new and useful Improvements in Friction-Clutches; and I do hereby declare the following to be a full, clear, and exact description of the invention, such as will enable others skilled in the art to which it pertains to make and use the same.

My invention relates to improvements in friction-clutches in which a hub, arm, and expansion-band forming the male member of the clutch are made integral, the band at a point opposite the supporting-arm being severed with a wedge made to operate between the ends of the band to expand the latter inside the rim or female member of the clutch. The ends of the band are provided with friction-rollers for engaging the wedge, and the latter is connected by means of an adjusting-screw with a lever for actuating the wedge, the latter in turn being operated by a conical sleeve made to slide endwise on the shaft, the sleeve having a suitable lever attachment for moving the same, to the end that a simple, effective, and durable friction-clutch is had at a small initial cost.

In the accompanying drawings, Figure 1 is a view in perspective of my improved friction-clutch. Fig. 2 is a view in perspective of the expanding ring and attachment, with details of the expanding ring in elevation. Fig. 3 is a perspective, partly in section, showing the friction-clutch connected with the band-wheel. Fig. 4 is an elevation in section of the expanding-wedge and attachments.

A represents the overhanging rim of the clutch, the same having an internal cylindrical bore. This rim, by means of a hub and arm or web, as the case may be, may be mounted directly on the shaft D, as shown in Fig. 1, in which case the rim may be made to serve also as a band-wheel; or this member of the clutch may be mounted on the hub of the band-wheel A', as shown in Fig. 3, or may be otherwise attached or made integral with another wheel.

B is an expansion friction-band made to operate against the inner periphery of the rim A. This band is made integral with a supporting-arm, B', and hub $B^2$, the latter, with the construction shown in Fig. 1, being bored to fit the shaft D.

The band B is cast whole and turned off a trifle less in diameter than the bore of the rim A. Also, holes are made laterally to receive the friction-rolls $b$, after which the band is severed between these rolls, enough metal being cut away to leave the faces of the rolls $b$ protruding far enough to engage the blunt expansion-wedge C. This wedge is mounted on the adjusting-screw $c$, the latter having a head or square part, $c'$, for turning the screw to elevate or depress the wedge and expand the band B more or less. The shank end of the screw outside the head terminates in a pin, $c^2$, and rests in a corresponding seat made in the lever E. The inner end of this lever, at $e$, is pivoted to ears $b'$, the latter being connected to the hub $B^2$. The free end of the lever E is curved toward the shaft, and is engaged by a conical sleeve, F, the latter being mounted on the shaft D and made to slide endwise thereon by a suitable shifting-lever, (not shown,) the sleeve F having an annular groove, in which operates a band, $f$, to which latter the shifting-lever is attached in the usual manner. By moving the sleeve F toward the clutch the free end of the lever E is made to mount the sleeve, thereby causing the wedge C to be pushed outward between the rollers $b$, thereby expanding the rim B and bringing the latter in firmer contact with the rim A, thereby causing the latter to turn with the expansion-band. When the sleeve F is reversed, the tension of the band B presses the wedge inward, thereby causing the lever E to return to its position, with the free end thereof resting on the shaft D. The screw $c$ may be adjusted from time to time, as may be made necessary from the wear of the parts.

By means of the friction-rollers $b$ the wear and friction of the wedge is greatly diminished.

The simplicity of the device and the comparatively small number of pieces employed render the device comparatively cheap in initial cost.

What I claim is—

1. In a friction-clutch, the combination, with the rim of the clutch and an expansion-band made to operate inside the said rim, of a wedge for expanding the band, rollers set in the end of the band for engaging the wedge, and a lever for operating the wedge, the parts being arranged substantially as set forth.

2. In a friction-clutch, the combination, with the rim of the clutch bored internally and an expansion-band made integral with its supporting-arm and hub, of a wedge for expanding the band and a lever for operating the wedge, the latter being connected with the lever by means of an adjusting-screw, substantially as set forth.

In testimony whereof I sign this specification, in the presence of two witnesses, this 7th day of March, 1887.

HARRY W. HILL.

Witnesses:
CHRIS. H. DORER,
ALBERT E. LYNCH.